US005175811A

United States Patent [19]

Sone et al.

[11] Patent Number: 5,175,811

[45] Date of Patent: Dec. 29, 1992

[54] FONT DATA PROCESSOR USING ADDRESSES CALCULATED ON THE BASIS OF ACCESS PARAMETERS

[75] Inventors: Takashi Sone, Tokyo; Jun Sato, Musashino; Koyo Katsura, Hitachiohta; Shigeru Matsuo, Hitachi, all of Japan

[73] Assignee: Hitachi, Ltd., Tokyo, Japan

[21] Appl. No.: 804,462

[22] Filed: Dec. 5, 1991

Related U.S. Application Data

[63] Continuation of Ser. No. 592,790, Oct. 9, 1990, which is a continuation of Ser. No. 194,890, May 17, 1988.

[30] Foreign Application Priority Data

May 20, 1987 [JP] Japan ............................... 62-123558

[51] Int. Cl.[5] ........................ G06F 3/14; G06F 15/62; G09G 5/22

[52] U.S. Cl. .................................... 395/150; 395/166; 395/165; 340/735; 340/748; 340/750

[58] Field of Search ............... 395/150, 151, 166, 164, 395/165, 137, 139, 134; 340/735, 748, 750

[56] References Cited

U.S. PATENT DOCUMENTS

| | | | |
|---|---|---|---|
| 4,533,911 | 8/1985 | Finegold | 340/727 |
| 4,622,546 | 11/1986 | Sfarti et al. | 340/748 |
| 4,642,624 | 2/1987 | Storch et al. | 340/735 |
| 4,695,835 | 9/1987 | Bugg | 340/750 |
| 4,745,561 | 5/1988 | Hirosawa et al. | 395/150 |
| 4,763,281 | 8/1988 | Arakawa | 340/735 X |
| 4,808,985 | 2/1989 | Tanuma et al. | 340/735 X |
| 4,811,241 | 3/1989 | Liang | 395/134 |
| 4,825,386 | 4/1989 | Bogacki | 364/518 |
| 4,837,564 | 6/1989 | Ogawa et al. | 340/750 |
| 4,837,712 | 6/1989 | Shibamiya | 395/150 |
| 4,847,787 | 7/1989 | Nishiyama et al. | 364/518 |
| 4,947,342 | 8/1990 | Katsura et al. | 364/518 |
| 4,953,102 | 8/1990 | Kimura et al. | 364/518 |
| 4,998,210 | 3/1991 | Kadono et al. | 364/518 |

FOREIGN PATENT DOCUMENTS 0196656 10/1986 European Pat. Off. .

OTHER PUBLICATIONS

"LSI Handbook", OHM Co., Ltd., Nov. 30, 1984, pp. 555-556 (English translation also provided).

*Primary Examiner*—Gary V. Harkcom
*Assistant Examiner*—Raymond J. Bayerl
*Attorney, Agent, or Firm*—Fay, Sharpe, Beall, Fagan, Minnich & McKee

[57] ABSTRACT

A font processing system includes font pattern storage for defining a font pattern and font pattern access parameter storage for storing parameters for making access to the font pattern storage. Address calculation is made on the basis of the font pattern access parameter and a pattern code supplied from outside to indicate a font pattern. The font pattern processing system includes a pattern drawing attribute indicator for indicating the attributes of pattern drawing by the font pattern data thus read out. The present invention processes predetermined font data at a high speed inside a font data processor on the basis of the pattern code and can easily accomplish diversification of font patterns.

27 Claims, 10 Drawing Sheets

FONT DATA PROCESSOR USING ADDRESSES CALCULATED ON THE BASIS OF ACCESS PARAMETERS

This is a continuation of application Ser. No. 07/595,790, now abandoned, filed Oct. 9, 1990, which is a continuation of application Ser. No. 07/194,890, filed May 17, 1988, now abandoned.

BACKGROUND OF THE INVENTION

This invention relates to processing of font data on the basis of pattern codes and further to a drawing technique using the font data, and to a technique which will be effective when applied to a display controller and a drawing processor using character font, for example.

As the technique which handles font patterns such as characters and symbols in a display controller and a drawing processor, a character generator system and a bit block transfer system have been employed in the past as described, for example, in "LSI Handbook" published by Ohm-sha, Nov. 30, 1984, p.p. 555-556.

The character generator system is one that expresses patterns such as characters and symbols by individual codes, stores these codes in a main storage or part of the region of an image memory, reads them out sequentially on the basis of instruction from a terminal device, converts them to the patterns such as characters by a character generator consisting of pattern generating ROM (Read-Only Memory) for display.

On the other hand, the bit block transfer system is a graphic display system which expresses the patterns such as the characters and symbols in a pixel unit by regarding them as figures drawn in a predetermined rectangular region, temporarily stores them in the image as it is in a bit map memory such as a frame buffer memory and handles the image, and display is accomplished by transferring in the block unit the image data of the rectangular region corresponding to a predetermined pattern from the main storage or the non-display region of the frame buffer memory to the display region of the frame buffer memory.

In the course of studies on the two systems described above as the technique for expressing the patterns such as the characters and symbols, the inventors of the present invention have found out that in accordance with the character generator system described above, display and drawing control are made unavoidably in a rough pattern unit because the width, shape and direction of the pattern to be displayed such as the character or symbol are determined fixedly by hardware of a character generator for generating the pattern.

In contrast, the bit block transfer system is more flexible in the aspect of a pattern control function because it can control the individual patterns in the pixel unit, but is not free from the following problems. When, for example, predetermined pattern data are transferred from outside a display controller to a frame buffer memory, the data corresponding to each bit of the rectangular region, in which the necessary pattern is defined, must be transferred through a microprocessor for controlling the system as a whole, so that the load to the microprocessor cannot be reduced. Furthermore, since the time required for the data transfer increases, the speed of drawing or displaying operation cannot be improved. If the necessary pattern data is stored in the non-display region of the frame buffer memory, transfer control of the pattern data on the basis of the microprocessor is not necessary but the microprocessor must yet execute the operation of converting the pattern code designated from an external terminal to the logical address. Such a conversion operation by the microprocessor results of course in the increase in the load to the microprocessor and from this aspect, too, the drawing or display operation of the pattern such as a character cannot be sped up.

SUMMARY OF THE INVENTION

It is therefore an object of the present invention to provide a font data processor which can process at a high speed predetermined font data on the basis of pattern codes and can easily accomplish diversification of the font patterns.

It is another object of the present invention to provide a font data processor which can improve freedom of pattern drawing on the basis of a fundamental pattern as the reference.

The above and other objects and novel features of the present invention will become more apparent from the following description when taken in Among the inventions disclosed in this application, the following will illustrate the outline of a typical invention.

The present invention first disposes font pattern access parameter storing means storing therein parameters for making access to the font patterns defined in font pattern storing means, and address calculation is made inside the system in order to read out the data of a corresponding font pattern on the basis of a pattern code supplied from outside and the font pattern access parameter described above. The font pattern storing means can be composed, for example, of a rewritable internal memory having a font shape defining region for defining individually the shape of a font pattern in a defining region having the same memory width and a font width defining region for defining a substantial character width of an individual font pattern in the font shape defining region, an external memory capable of transferring data to the internal memory through a local bus, and the like. The font pattern access parameter storing means can be constituted by an external memory connected to the local bus or an internal memory to which data can be sent from a microprocessor.

According to the construction described above, the font pattern data corresponding to the pattern code supplied from outside can be read out from a predetermined region of the font pattern storing means only by internal calculation processing on the basis of the font pattern access parameter. Moreover, the width of the data or the like read out from the individual font defining region can be changed easily by changing the font pattern access parameter without changing the font pattern data itself defined in the font pattern storing means.

Therefore, predetermined font data can be processed inside the processor at a high speed on the basis of the pattern code and diversification of font patterns can be accomplished easily.

The font data processor of the present invention includes further pattern drawing attribute indicating means for indicating the attributes of pattern drawing on the basis of the font pattern data read out from the font pattern storing means. This pattern drawing attribute indicating means may be, for example, an internal memory storing rewritable pattern drawing attribute defining parameters such as a drawing distance between the patterns and numeric data relating to enlargement, reduction and inclination of a pattern, for example, a control register for holding rewritable control data for giving switch instruction of a pattern drawing operation to microprogram control means or a control code contained in part of a command code for giving the switch instruction of the pattern drawing operation.

According to the construction described above, the font pattern data read out from the font pattern storing means by the internal calculation processing on the basis of the font pattern access parameter can be drawn while changing its pattern structure or the mutual arrangement of patterns on the basis of internal processing in accordance with the drawing attribute indicated by the pattern drawing attribute indicating means. Accordingly, freedom of pattern drawing on the basis of predetermined original font data as the reference can be improved.

DESCRIPTION OF THE PREFERRED EMBODIMENTS

Figure 1:
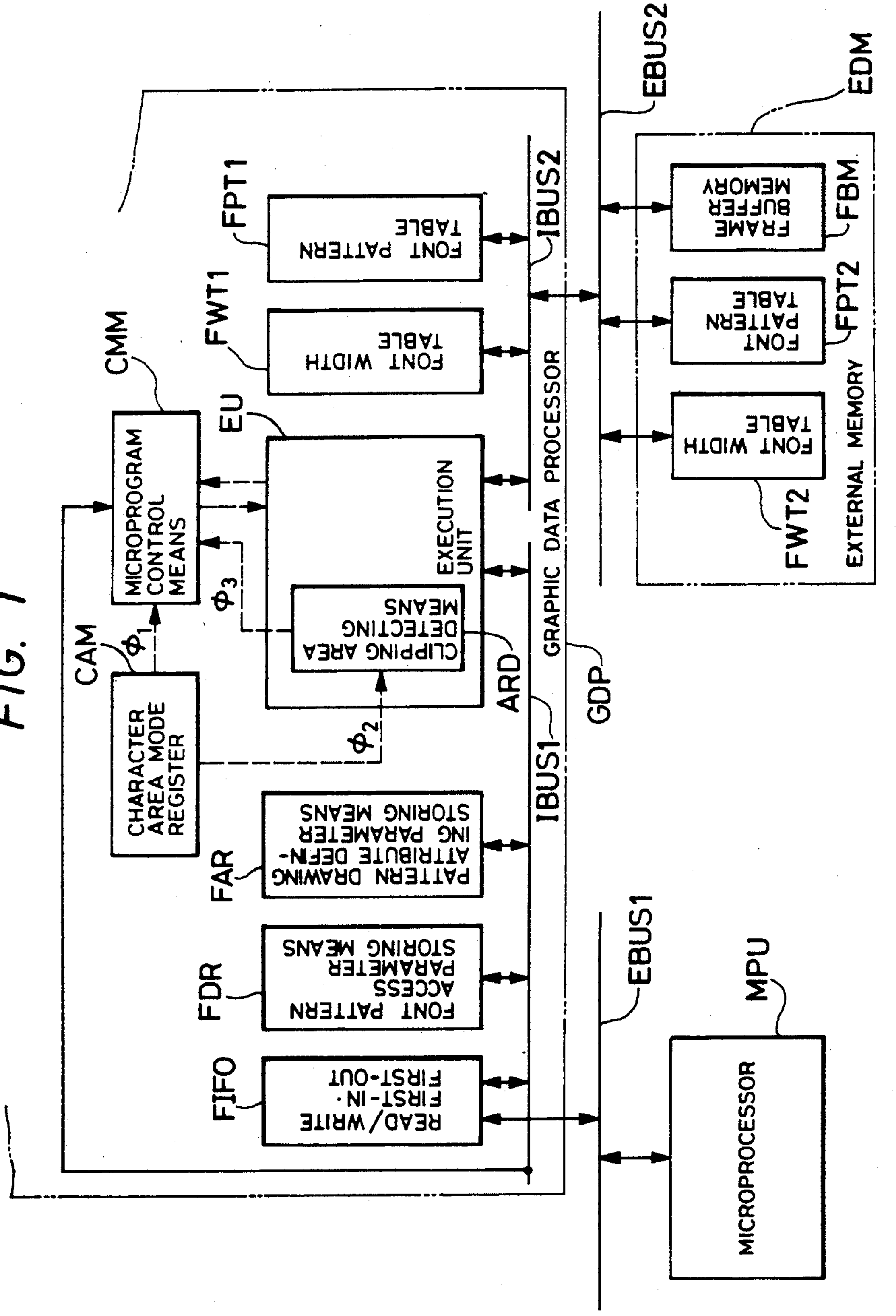
FIG. 1 is a functional block diagram of a graphic data processor in accordance with one embodiment of the present invention.

FIG. 1 shows, as a functional block, part of a graphic data processor to which the font data processor in accordance with the present invention is applied. The graphic data processor GDP shown in the drawing is formed on one semiconductor substrate by known semiconductor integrated circuit fabrication technique, though it is not particularly limited thereto. The graphic data processor GDP in this embodiment functions as a display controller for supporting the display control function and drawing control function of a display system which includes a CRT (Cathode-Ray Tube); not shown display device, though not particularly limited thereto.

The graphic data processor GDP shown in FIG. 1 plays the role of a peripheral controller in a predetermined display system and includes an interface for an external bus EBUS 1 as a system bus to which a microprocessor MPU and a system memory, not shown, are connected, and an interface for an external bus EBUS 2 as a local bus to which a frame buffer memory FBM as a bit map memory and the like are connected. Though not particularly limitative, the frame buffer memory FBM connected to the external bus EBUS 2 has a dual port. One of the access ports is connected to the external bus EBUS 2 and the other is connected to the CRT display through a dot shifter (not shown).

The graphic data processor GDP interprets the command supplied from the microprocessor MPU through the external bus EBUS 1 and supports the drawing control functions for executing pattern drawing of predetermined characters and symbols, drawing of arbitrary figures, filling of figures, enlargement, reduction and rotation of the characters and figures on the frame buffer memory FBM and also supports the display control function for displaying the image data stored in the frame buffer memory FBM on the CRT display.

Though not particularly limitative, this graphic data processor GDP includes microprogram control means CMM having a control for executing the command supplied from the microprocessor MPU in the microprogram control system and consisting of a command input register, an instruction decoder for decoding the operation code of the command, a micro address controller for controlling the microaddress on the basis of the output of the instruction decoder and the like, a microaddress decoder for decoding the output of the microaddress controller, a microprogram memory from which a predetermined sequence of microinstruction is read out on the basis of the microaddress decoder and a microinstruction decoder for decoding the microinstruction read out from the microprogram memory and outputting a control signal to each constituent. The GDP further includes an execution unit EU for executing the instruction in accordance with the microprogram.

Particularly, the graphic data processor GDP in this embodiment has a function of processing the font data such as characters in accordance with the pattern codes supplied thereto either directly from a keyboard, not shown, or from outside through the microprocessor MPU.

To accomplish this function, there are first disposed a font pattern table FPT 1 and a font width table FWT 1 as font pattern storing means for defining rewritably the font patterns such as characters and font pattern access parameter storing means FDR for making access to the data of the font pattern defined in the font pattern table FPT 1 and the font width table FWT 1. The execution unit EU described above executes the address calculation for reading out the font pattern data corresponding to the pattern codes from the font pattern table FPT 1 and the font width table FWT 1 on the basis of the pattern code supplied from outside and of the font pattern access parameters.

In accordance with FIG. 1, the font pattern table FPT 1 and the font width table FWT 1 are connected to the execution unit EU through the internal bus IBUS 2 and the font pattern access parameter storing means FDR is connected to the execution unit EU through the internal bus IBUS 1. The internal bus IBUS 1 is connected to the aforementioned external bus EBUS 1 through a first-in/first out type read/write FIFO as the interface with the system side. The internal bus IBUS 2 is connected to the local bus or the external bus EBUS 2 as the frame buffer bus.

In FIG. 1, the external memory EDM is connected to the external bus EBUS 2. Besides the frame buffer memory FBM described above, this external memory EDM includes typically other font pattern table FPT 2 and font width table FWT 2 consisting of ROM (Read-Only Memory) and having a relatively large memory capacity. These frame buffer memory FBM, font pattern table FPT 2 and font width table FWT 2 constitute the external memory EDM to which access can be made directly from the graphic data processor GDP. Access to the font pattern table FPT 2 and font width table the same way as in the case of the internal font pattern table EPT 1 and font width table FWT 1.

As pattern drawing attribute indicating means for indicating the attributes of the pattern drawing on the basis of the font pattern data read out from the font pattern table FPT 1 or FPT 2 and font width table FWT 1 or FWT 2 as the font pattern storing means, there are disposed further pattern drawing attribute defining parameter storing means FAR for storing rewritable pattern drawing attribute defining parameters such as numeric data and a character area mode register as a control register for holding rewritably the control data for giving switching indication of the pattern drawing operation to the microprogram control means CMM, though the construction is not particularly limitative. Though not shown in FIG. 1, the control code contained in the part of the command code is one of the pattern drawing attribute indicating means in this embodiment in order to give the switching indication of the pattern drawing operation.

Figure 2:
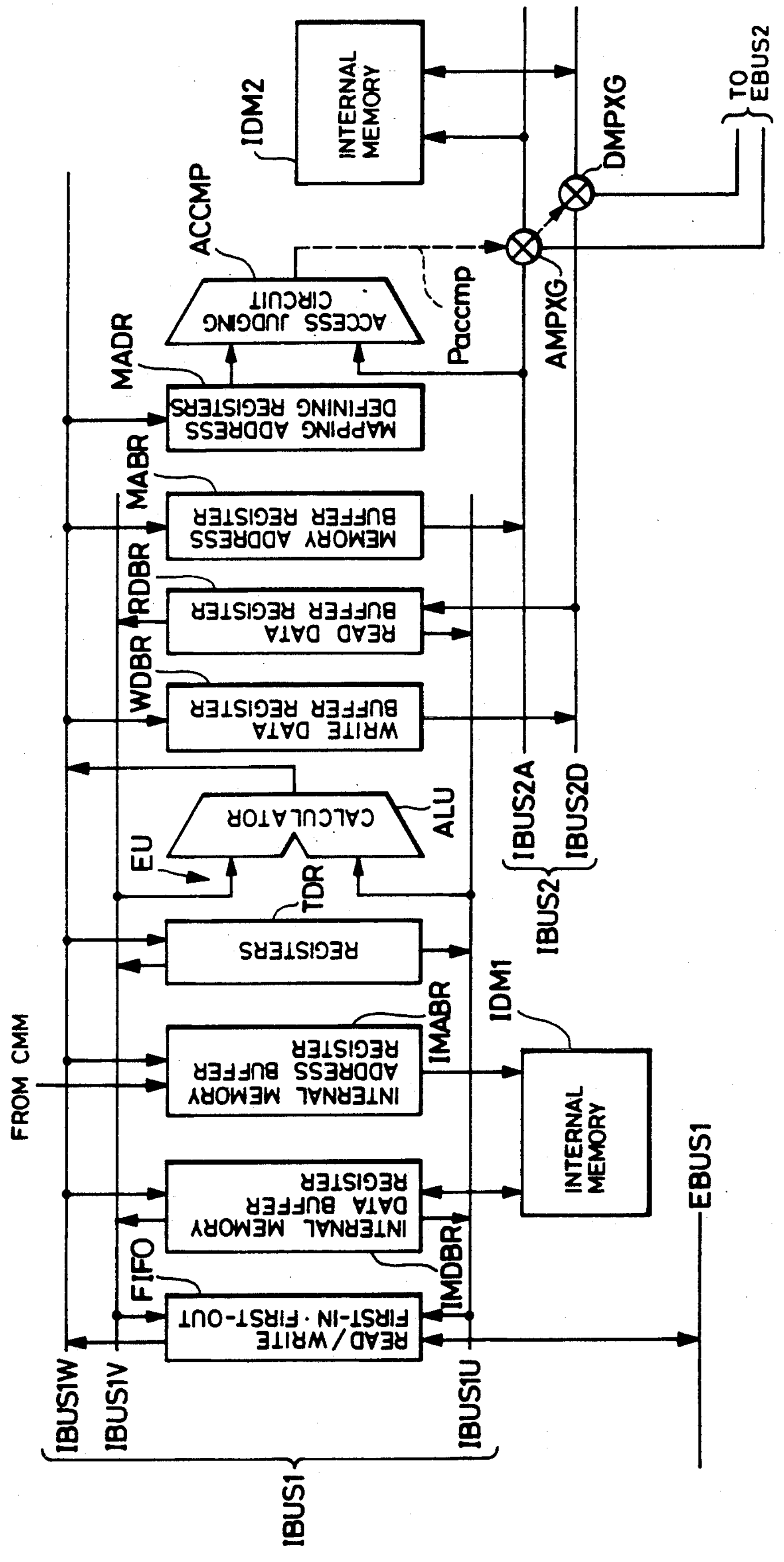
FIG. 2 is a partly detailed block diagram of the graphic data processor shown in FIG. 1.

FIG. 2 shows the detail of the functional block diagram shown in FIG. 1.

In FIG. 2, the internal bus IBUS 1 has a three-bus structure consisting of internal buses IBUS 1U, IBUS 1V and IBUS 1W, though the structure is not particularly limitative, and the internal bus IBUS 2 consists of an internal address bus IBUS 2A and an internal data bus IBUS 2D. The interface function of the internal buses IBUS 1 and IBUS 2 are borne by a read data buffer register RDBR, a write data buffer register WDBR and a memory address buffer register MABR, though this is not particularly limitative.

FIG. 2 shows typically a calculator ALU and registers TDRs as the principal functional block constituting the execution unit EU. Though not particularly limitative, the register groups include various working registers, control registers, temporary registers, current pointers for indicating the present drawing position in the logical address space such as X-Y coordinate system and drawing pointers to which the memory address corresponding to the value of the current pointer for indicating the present drawing address in the physical address space such as a memory address space is set.

Though not particularly limitative, the font pattern access parameter storing means FDR and the pattern drawing attribute defining parameter storing means FAR are formed in a predetermined region of the internal memory IDM 1 consisting of RAM (Random Access Memory) in FIG. 2. The parameter storing means can be formed in the registers TDR described above. Furthermore, the character area mode register CAM can be formed by part of the registers TDR.

Though not particularly limitative, the address signal is supplied to the internal memory IDM 1 through the internal memory address buffer register IMABR and data exchange is made through the internal memory data buffer register IMDBR. Its access control is executed on the basis of the microprogram. The address data can be set to the internal memory address buffer register IMABR either directly through the calculator ALU or through the address portion of a predetermined microinstruction stored in the microprogram memory, not shown, constituting the microprogram control means CMM.

In FIG. 2, the font pattern table FPT 1 and the font width table FWT 1 are formed in the high speed internal memory IDM 2 consisting of RAM, though this is not particularly limitative. Though not particularly limitative, either, this internal memory IDM 2 receives the address signal from the memory address buffer register MABR through the internal address bus IBUS 2A and exchanges data with the read data buffer register RDBR and the write data buffer register WDBR through the internal data bus IBUS 2D. Its access control is executed on the basis of the microprogram. The address data is set to the memory address buffer register MABR through the calculator ALU.

This internal memory IDM 2 is a memory region capable of mapping in continuation in an arbitrary manner to the external address space allotted to the external memory EDM consisting of the frame buffer memory FBM, the font pattern table FPT 2 and the font width table FWT 2, though this arrangement is not particularly limitative.

In other words, the external bus EBUS 2 is branched from the internal bus IBUS 2 through an address multiplex gate AMPXG and a data multiplex gate DMPXG, and an access is made selectively to either one of the external memory EDM and the internal memory IDM 2 connected to this external bus EBUS 2 between the memory address buffer register MABR, the read data buffer register RDBR and the write data buffer register WDBR. Whether the access is made to the internal memory IDM 2 or to the external memory EDM is determined by the selecting operation of the address multiplex gate AMPXG and data multipelx gate DMPXG. This selection control is made by the output control signal $\phi$accmp of an access judging circuit ACCMP which compares the output address data of mapping address defining registers for defining the mapping address of the internal memory IDM 2 for the external address space with the address data outputted from the memory address buffer register MABR. When the address data outputted from the memory address buffer register MABR is contained in the mapping address of the internal memory IDM 2, the access judging circuit ACCMP selectively connects the address multiplex gate AMPXG and the data multiplex gate DMPXG to the internal memory IDM 2. When the address data outputted from the memory address buffer register MABR is not contained in the mapping address of the internal memory IDM 2 or is not coincident therewith, the access judging circuit ACCMP selectively connects the address multiplex gate AMPXG and the data multiplex gate DMPXG to the external memory EDM.

Though not particularly limitative, data setting to the mapping address defining registers MADR is made on the basis of the microprogram control through the calculator ALU and the internal bus IBUS IW.

As described above, the internal memory IDM 2 capable of mapping is disposed in continuation in an arbitrary manner to the external address space allotted to the external memory EDM. Therefore, when the access to this internal memory IDM 2 is detected, the access object is switch-controlled from the external memory EDM to the internal memory IDM 2 so that the internal memory IDM 2 with a high speed accessible LSI and the external memory EDM capable of having a large memory capacity can be handled in the same way. Therefore, the font pattern tables FPT 1 and FPT 2 and the font width tables FWT 1 and FWT 2 can be handled equivalently. Furthermore, drawing efficiency can be improved remarkably if the data having high access frequency or the data having relatively high use frequency among the data defining individually the shapes and widths of a plurality of kinds of font patterns in this embodiment are stored in the internal memory IDM 2.

Figure 3:
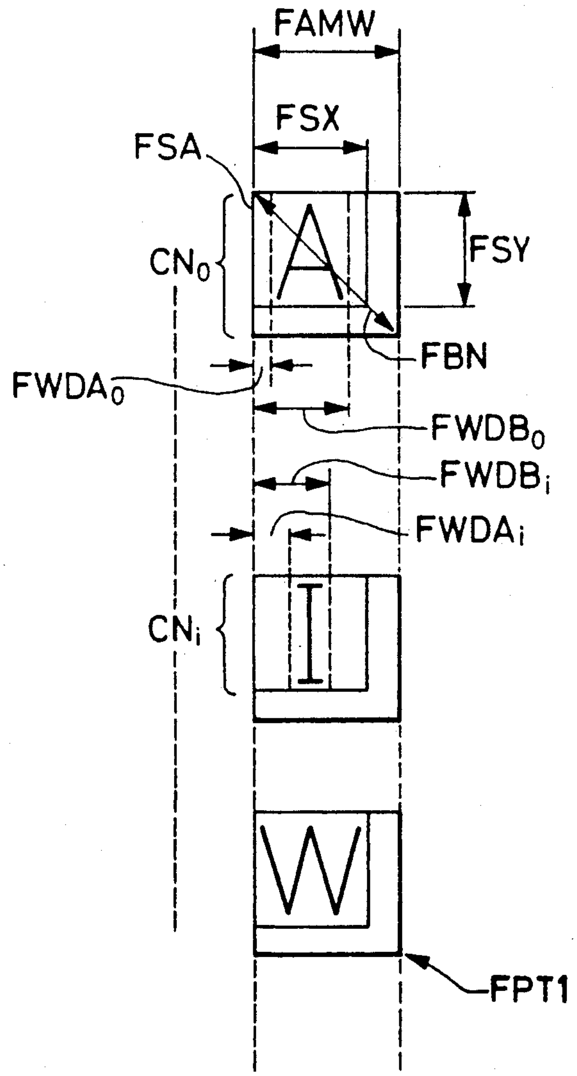
FIG. 3 shows an example of the format of a font pattern table.

FIG. 3 is an explanatory view showing an example of the font pattern table FPT 1 described above.

Though not particularly limitative, the font pattern table FPT 1 is a font format defining region which expresses the characters such as the alphabet one by one in the binary pattern ("1", "0") in the pixel unit in a predetermined rectangular region and is stored sequentially in a predetermined memory width in the sequence of pattern codes $CN_o$ to $CN_n$ on the continuous address space in the predetermined memory region of the internal memory IDM 2. In FIG. 3, FSA is a font pattern table start address representing the start address of the font pattern table FPT 1; FBN is a font bit number (which is in common in the defining region of each character) meaning the total number of bits constituting the defining region of one character; FAMW is a font pattern table memory width representing the memory width of the font pattern table in the bit unit; and FSX and FSY are font sizes representing the font size to be developed inside the defining region of one character, that is, the font size representing the longitudinal and transverse lengths of the original font size in the bit unit. The font sizes FSX and FSY are common to a group of character patterns such as the alphabet stored in the font pattern table FPT 1. Incidentally, the explanation given above can be used as the explanation of an example of the font pattern table FPT 2 by replacing the internal memory IDM 2 by the external memory EDM and the font pattern table FPT 1 by the font pattern table FPT 2.

Figure 4:
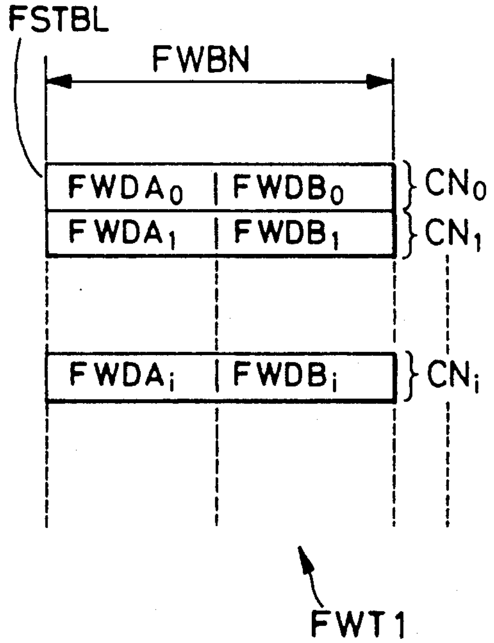
FIG. 4 shows an example of the format of a font width table.

FIG. 4 is an explanatory view showing an example of the font width table FWT 1 described already.

Though not particularly limitative, the font width table FWT 1 is a font width defining region for defining individually the substantial width of the individual font pattern for each pattern, and the font width data $FWDA_o$, $FWDB_o$ to $FWDA_i$, $FWDB_i$ for defining the substantial width of the individual font pattern stored in the sequence of the pattern codes $CN_o$ to $CN_n$ in a predetermined memory width on the continuous address space in the predetermined memory region of the internal memory IDM 2. As shown in FIG. 3, each of the font width data $FWDA_o$, $FWDB_o$ to $FWDA_i$, $FWDB_i$ is the data which defines the distance from the right end of the font pattern table FPT 1 or FPT 2 in the bit unit.

In FIG. 4, FSTBL is the font width table start address representing the start address of the font width table FWT 1 and FWBN is the font width table memory width representing the memory width of the font width table, that is, the bit number of the font width data corresponding to one character. Incidentally, the explanation given above can be used as the explanation of an example of the font width table FWT 2 by replacing the internal memory IDM 2 by the external memory EDM and the font width table FWT 1 by the font width table FWT 2.

Figure 5:
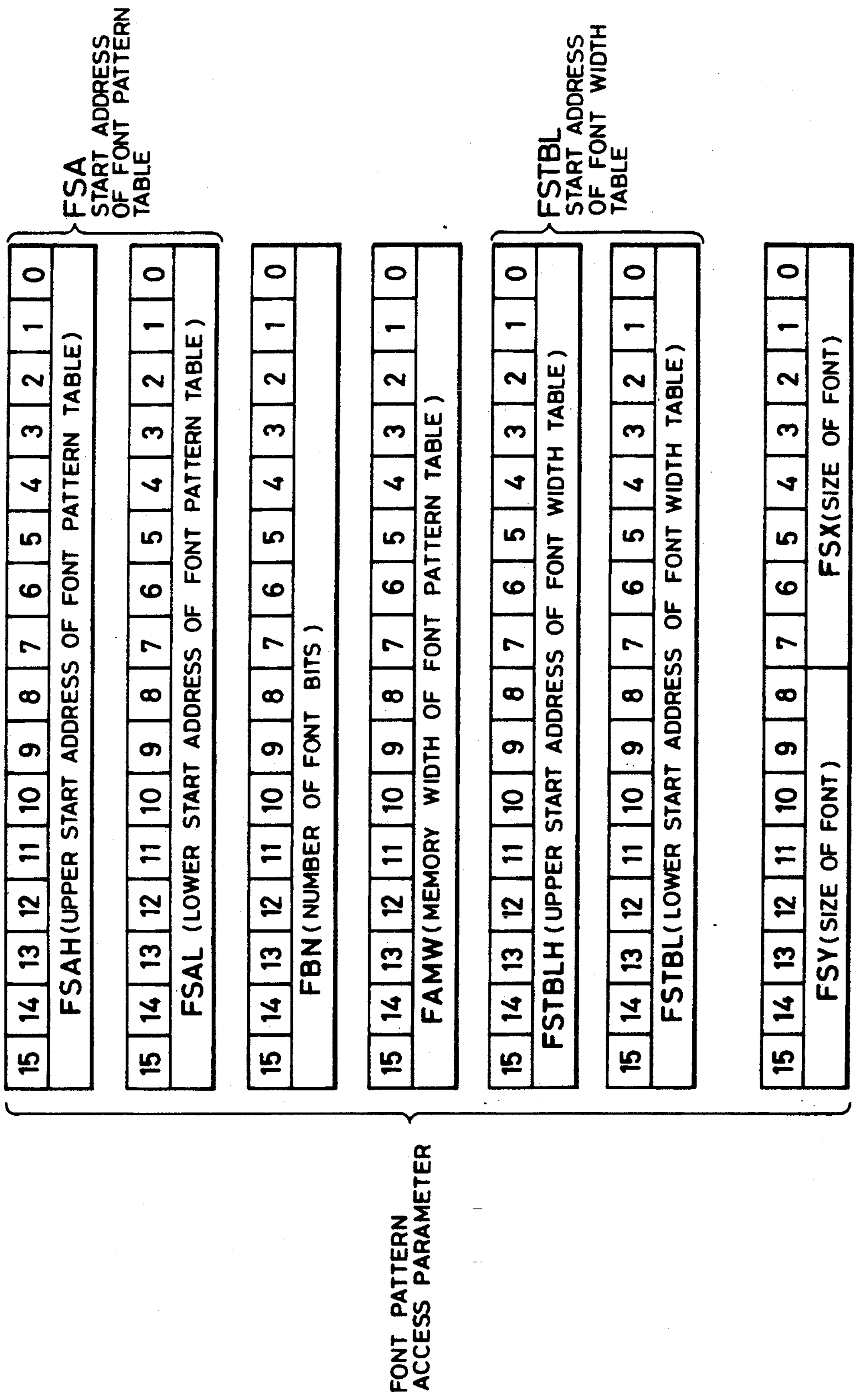
FIG. 5 shows an example of font pattern access parameters.

FIG. 5 is an explanatory view showing an example of the font pattern access parameters stored in the font pattern access parameter storing means FDR.

Though not particularly limitative, the font pattern access parameter storing means FDR is constituted in a 16-bit width in the predetermined region of the internal memory IDM 1. In accordance with this embodiment, the access parameter consists of the font pattern start address FSA having 16 bits for each of the upper and lower orders (whose upper address is represented by FSAH and whose lower address is represented by FSAL), the font bit number FBN described above, the font pattern table memory width FAMW, the font width table start address FSTBL having 16 bits for each of the upper and lower orders (whose upper address is represented by FSTBLH and whose lower address is represented by FSTBLL) and the font size FSX, FSY for each of the font pattern table FPT 1 having the format such as shown in FIG. 3 and the font width table FWT 1 having the format such as shown in FIG. 4.

Though not particularly limitative, the font width table memory width FWBN in this embodiment is the access parameter which is set fixedly irrespective of the content of the font pattern. Therefore, it is not set to the rewritable font pattern access parameter storing means FDR but its value is written into the microprogram. Incidentally, the font width table memory width FWBN may be set to the rewritable font pattern access parameter storing means FDR.

Next, the description will be given on the address calculation when the access is made to the font pattern table FPT 1 or to the font width table FWT 1 by use of the access parameter described above. Incidentally, the following description can be used as the explanation of the address calculation when the access is made to the font pattern table FTP 2 or to the font width table FWT2, by replacing the font pattern table FPT 1 by the font pattern table FPT 2 and the font width table FWT 1 by the font width table FWT 2.

Though not particularly limitative, the pattern codes $CN_o$ to $CN_n$ which correspond to the individual character patterns on a 1:1 basis correspond to the number from "0" to "n". The start bit address CNPSA and end bit address CNPEA of the character pattern region corresponding to a predetermined pattern code $CN_i$ in the font pattern table FPT 1, for example, can be given by the following equation (1) and (2):

$$CNPSA = FSA + FBN \times CN_i \quad (1)$$

$$CNPEA = FSA + FBN \times CN_i + FBN - 1 \quad (2)$$

The start bit address CNWSA and end bit address CNWEA of the font width data corresponding to this pattern code $CN_i$ in the font width table FWT 1, for example, can be given by the following equation (3) and (4):

$$CNWSA = FSTBL + FWBN \times CN_i \quad (3)$$

$$CNWEA = FSTBL + FWBN \times CN_i + FWBN - 1 \quad (4)$$

Figure 12:
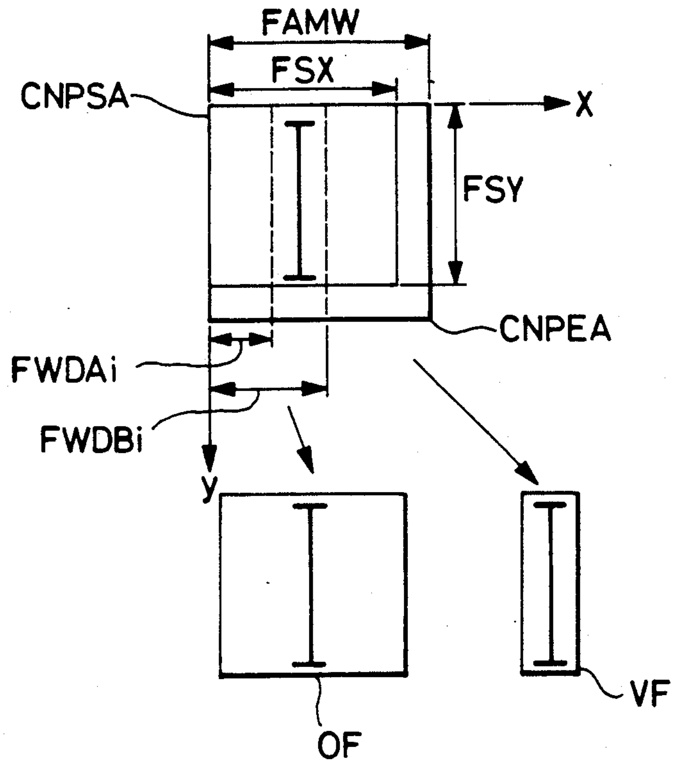
FIG. 12 is an explanatory view of the drawing attributes by a variable width and a fixed width.

Though not particularly limitative, the font pattern read out from the font pattern table FPT 1 in this embodiment can be selected as the original font OF of the fixed size determined by the font size FSX, FSY as the access parameter or the variable font VF of the variable size determined for each pattern by the font width data $FWDA_o$, $FWDB_o$ to $FWDA_n$, $FWDB_n$, as shown in FIG. 12.

When the predetermined font pattern data is read out as the original font OF, reference is not substantially made to the font width table in the address calculation. The bit address $BA_{of}$ necessary for reading out the original font OF corresponding to the pattern code $CN_i$ is given by the following equation (5):

$$BA_{of} = CNPSA + (x-1) + (y-1) \times FAMW \quad (5)$$

In eq. (5) above, x represents an xth column from the left end of the original font OF corresponding to this pattern code $CN_i$ and y represents a yth row from the uppermost row, and they satisfy the relation of the following formulas (6) and (7):

$$1 \leqq x \leqq FSX \quad (6)$$

$$1 \leqq y \leqq FSY \quad (7)$$

When the predetermined font pattern is read out as the variable font VF, reference is made to the font width table FWT in the address calculation. The bit address $BA_{vf}$ necessary for reading out the variable font VF corresponding to the pattern code $CN_i$ is given by the following equation (8):

$$BA_{vf} = CNPSA + (x + FWDA_i - 2) + (y-1) \times FAMW \quad (8)$$

In equation (8) given above, x represents the xth column from the left end of the variable font VF corresponding to this pattern code $CN_i$ and y represents the yth from the uppermost row, and they satisfy the following relation (9) and (10):

$$1 \leqq x \leqq FWDB_i - FWDA_i + 1 \quad (9)$$

$$1 \leqq y \leqq FSY \quad (10)$$

Figure 7:
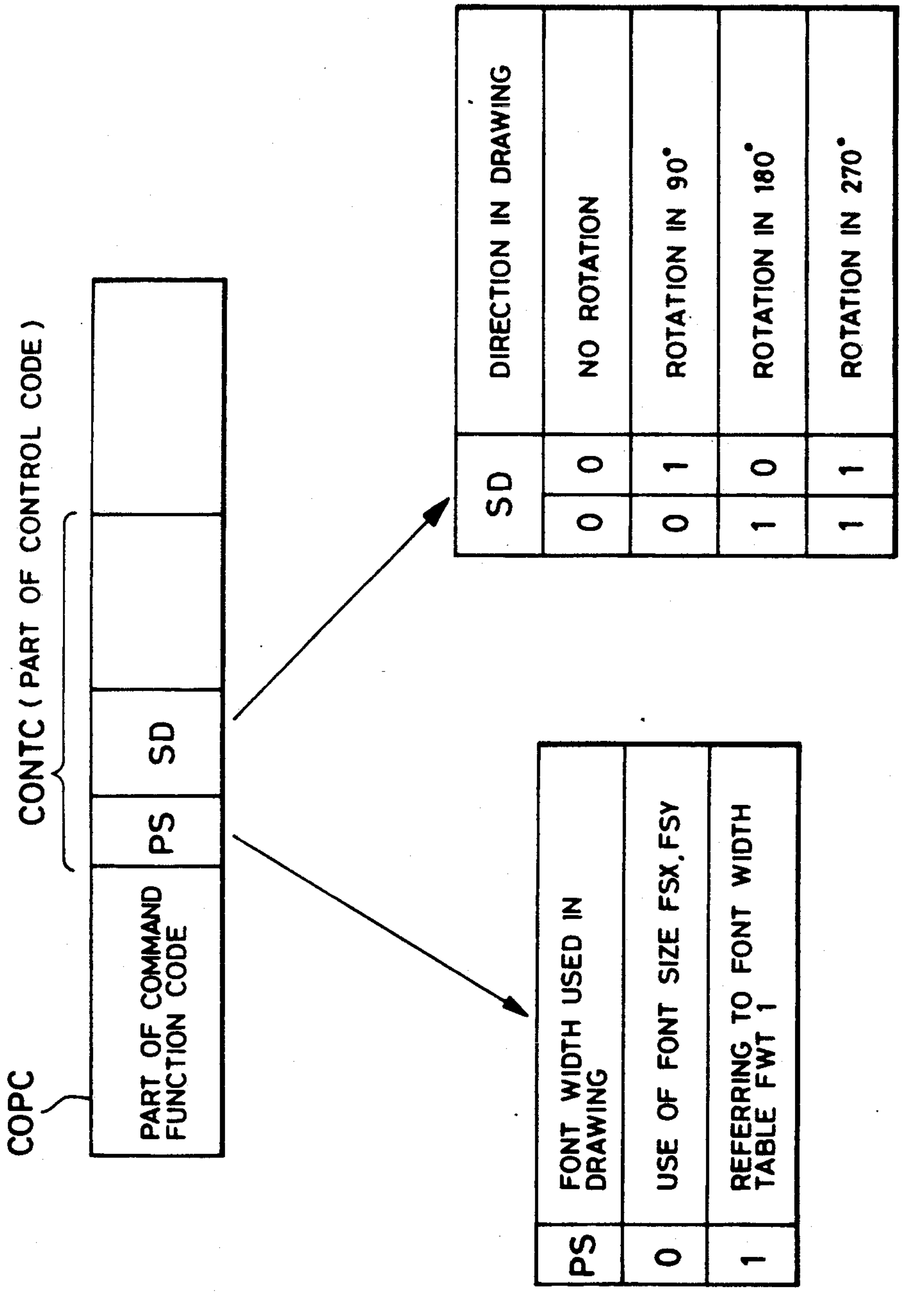
FIG. 7 shows an example of command format supplied from a microprocessor.

The address calculation explained with reference to the formulas given above is carried out by the execution unit EU and such calculation control is made by the microprogram corresponding to the pattern drawing command. Though not particularly limitative, the pattern drawing command consists of a single or a plurality of words which contain part of command function code COPC, part of control code CONTC, etc., as shown in FIG. 7. Though not particularly limitative, the part of control code CONTC contains the pattern code of the character or the like as the drawing object and contains, whenever necessary, the drawing character number and the drawing start point in the logical address space. Selection of the original font OF and the variable font VF, that is, selection of the drawing width of the character pattern, is indicated by a 1-bit control bit PS contained in the part of control code CONTC. When this control bit PS is "0", drawing by the original font OF is indicated and when the control bit PD is "1", drawing by the variable font VF is indicated.

When the predetermined pattern drawing command is supplied to the microprogram control means CMM, the microprogram corresponding to this command is invoked and the address calculation control is executed in accordance with the pattern code and the font access parameter so that the predetermined font pattern data is read out from the font pattern table FPT 1. The font pattern data thus read out is then subjected to color development and calculation processing in accordance with the predetermined drawing mode and is thereafter drawn in the display region of the frame buffer memory by the current pointer corresponding to the drawing start point indicated by the command and by the drawing pointer indicating the memory address corresponding to the content of the former.

Next, the explanation will be given on the pattern drawing attribute indicating means for indicating the attribute of the pattern drawing on the basis of the font pattern data read out from the font pattern table FPT 1 or FPT 2.

The pattern drawing attribute indicating means in this embodiment is the pattern drawing attribute defining parameter storing means FAR, the character area mode register CAM as the control register for rewritably holding the control data for providing switch instruction of the pattern drawing operation to the microprogram control means CMM and the indicating control code for the switch instruction of the pattern drawing operation which is contained at part of the command code.

Figure 6:
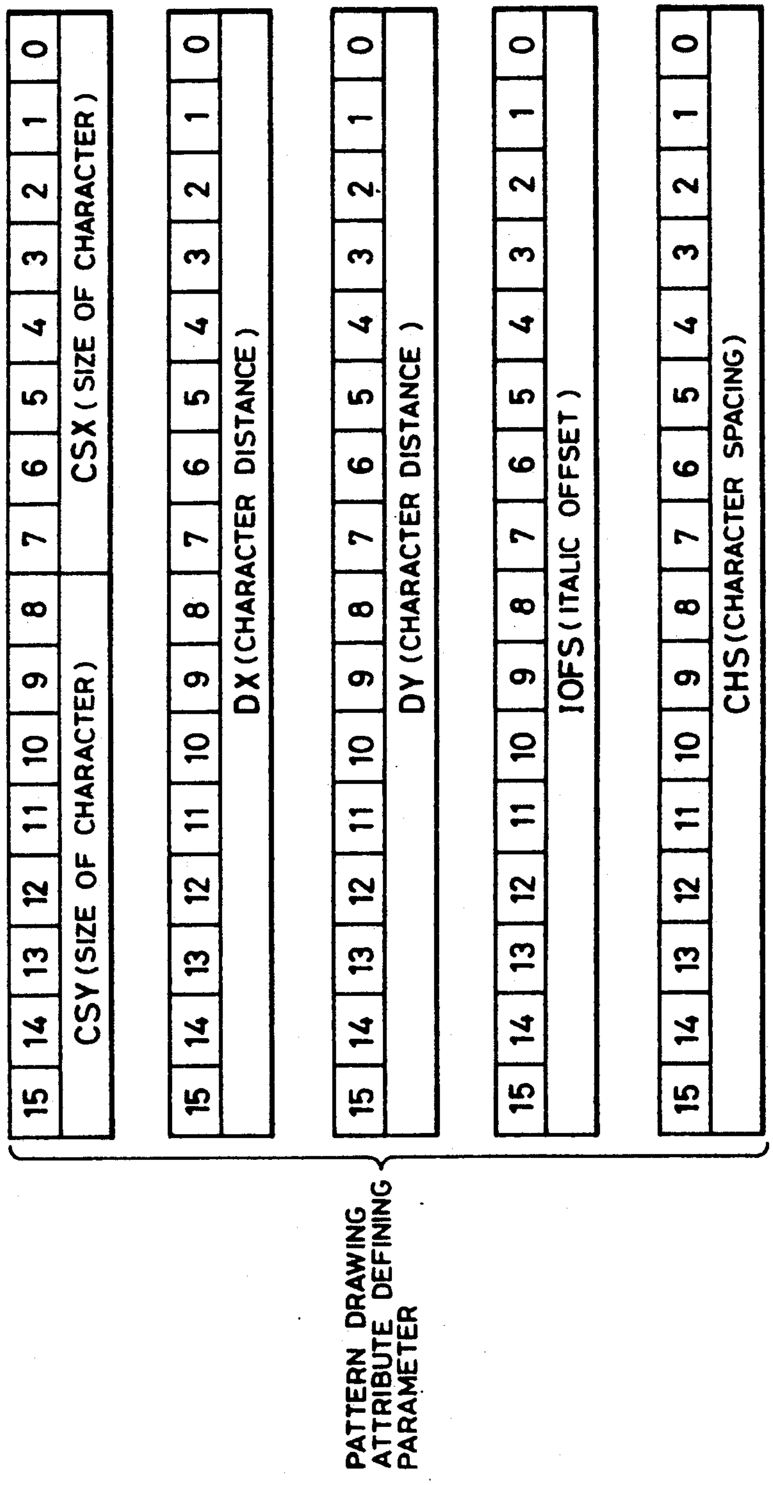
FIG. 6 shows an example of parameters for defining pattern drawing attributes.

FIG. 6 shows an example of the pattern drawing attribute defining parameter stored in the pattern drawing attribute defining parameter storing means FAR.

Figure 13:
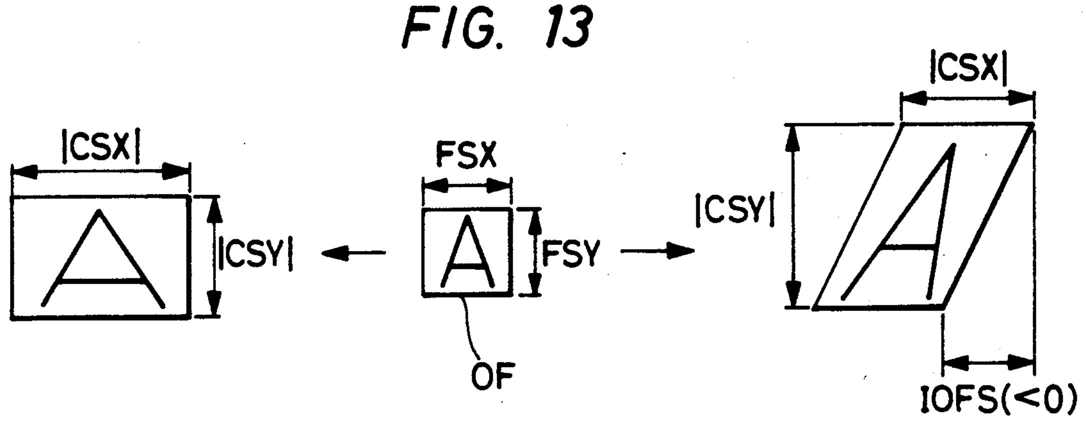
FIG. 13 is an explanatory view of the drawing attributes relating to enlargement, reduction and inclination of the font pattern.
Figure 14:
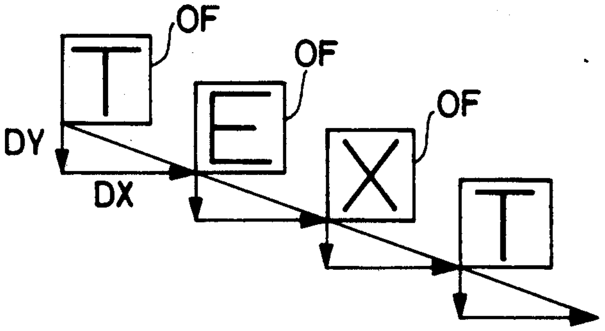
FIG. 14 is an explanatory view of the drawing attribute relating to the pattern gap of fixed width patterns.
Figure 15:
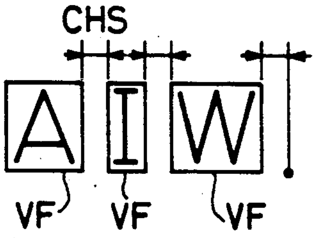
FIG. 15 is an explanatory view of the drawing attributes relating to the pattern gap of variable width patterns.

The pattern drawing attribute defining parameter storing means FAR is constituted in a 16-bit width in the predetermined region of the internal memory IDM 1, though this is not particularly limitative. In accordance with this embodiment, the pattern drawing attribute defining parameter is the numeric data as the object of calculation in the execution unit EU, and consists of the character size CSY, CSX defining the longitudinal and transverse sizes of the character to be drawn in the pixel unit when the character is drawn in enlargement or reduction as shown in FIG. 13, the character distance DY, DX defining the pattern distance in the pixel unit when the character is drawn on the basis of the original font OF as shown in FIG. 14, itallic offset IOFS defining the inclination of the character in the pixel number in the transverse direction as shown in FIG. 13 and the character spacing CHS defining the pattern distance when the character is drawn on the basis of the variable font VF as shown in FIG. 15.

The various pattern drawing attribute defining parameters described above are sequentially read out on the basis of the reference address indicated by the microprogram corresponding to the various pattern drawing commands and are utilized for the calculation of the drawing indication point in the current pointer not shown in the drawing.

Figure 16:
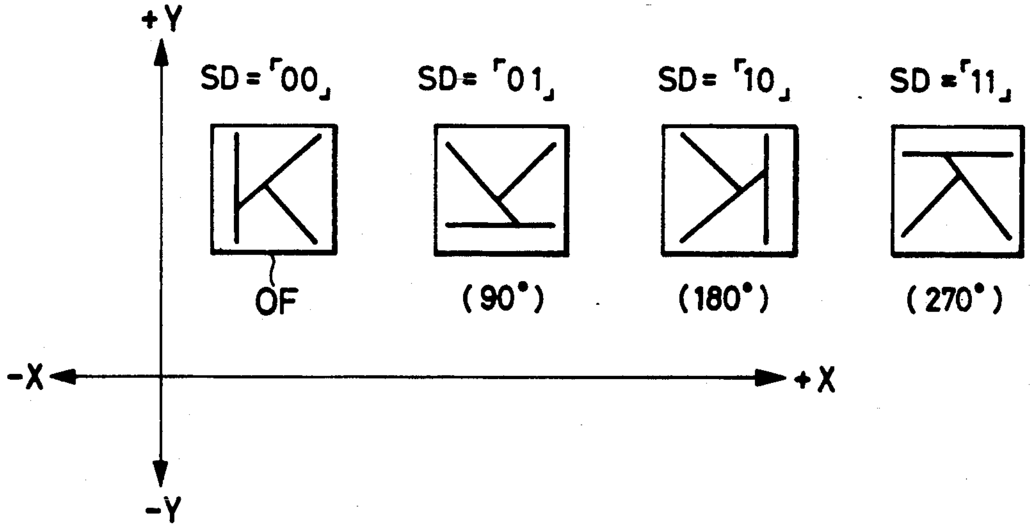
FIG. 16 is an explanatory view of the drawing attributes relating to the rotation of the pattern.

As shown in FIG. 7, the control code of the pattern drawing attribute indicating means includes the 2-bit control bits SD for indicating the rotation angle of drawing for the font pattern, that is, the direction in drawing, along with the control bit PD described above (which indicates the selection of the drawing width of the character pattern, that is, the selection of the original font OF or the variable font VF). The indication of the direction in of the drawing based on this control bit SD is four kinds as shown in FIG. 16. When the control bit SD is "00", it indicates that the character font pattern is to be drawn in its direction. In this case, if the read direction of the font pattern data is in the +X direction, control is made so that the moving direction of the drawing points in the X-Y coordinate system is in the same +X direction. When the control bit SD is "01", it indicates that the character font pattern is to be drawn while being rotated in 90°. In this case, if the reading direction of the font pattern data is in the +X direction, control is made so that the moving direction of the drawing points in the X-Y coordinate system is in the +Y direction. When the control bit SD is "10", it indicates that the character font pattern is to be drawn while being rotated in 180°. In this case, if the reading direction of the font pattern data is in the +X direction, control is made so that the moving direction of the drawing points in the X-Y coordinate system is in the −X direction. When the control bit SD is "11", it indicates that the character font pattern is to be drawn while being rotated in 270°. In this case, if the reading direction of the font pattern data is in the +X direction, control is made so that the moving direction of the drawing points in the X-Y coordinate system is in the −Y direction.

The set values of the control bits SD and PS described above are detected when the command is interpreted in the microprogram control means CMM, and the microprogram to be invoked in accordance with the detection result is switched. For example, the microprogram to be invoked is switched when the command code as the invoke entry address of the microprogram is given.

Though not particularly limitative, 3-bit control data for indicating drawing of patterns to the clipping region in the pixel unit, the pattern unit and the pattern sequence unit are set to the character area mode register CAM described above as the pattern drawing attribute indicating means. This control data indicates the stroke when the control bit SD is "100", the character when "101", the string when "110" or "111" and no clipping in the combinations of other bits. The indication of stroke described above represents the operation mode in which the drawing is not made for the pixels outside the clipping region and the indication of character represents the operation mode in which the character bridging over the outside of the clipping region is not drawn. The indication of string represents the operation mode in which the character string bridging over the clipping region is not drawn.

Pattern drawing control for the clipping region on the basis of the 3-bit control data set to the character area mode register CAM is accomplished on the basis of the operation switch of the microprogram control means CMM based on the control signal $\phi_1$ and of the operation switch of the clipping area detecting means ARD based on the control signal $\phi_2$ as shown in FIG. 1, though this arrangement is not particularly limitative.

Figure 9:
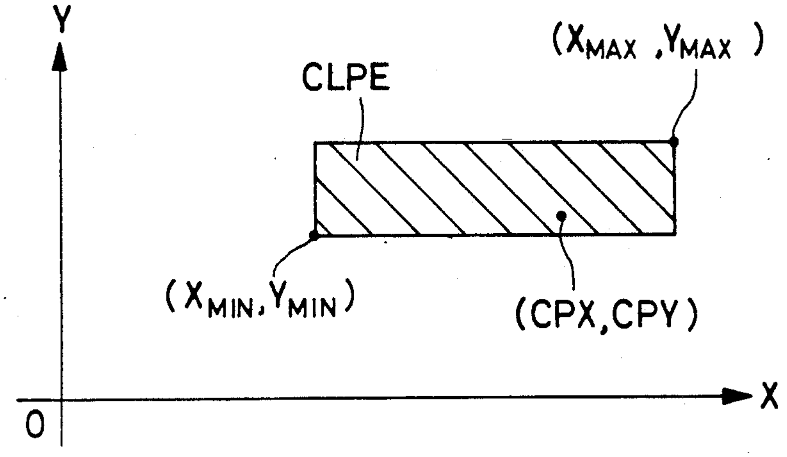
FIG. 9 is an explanatory view of a clipping area.
Figure 10:
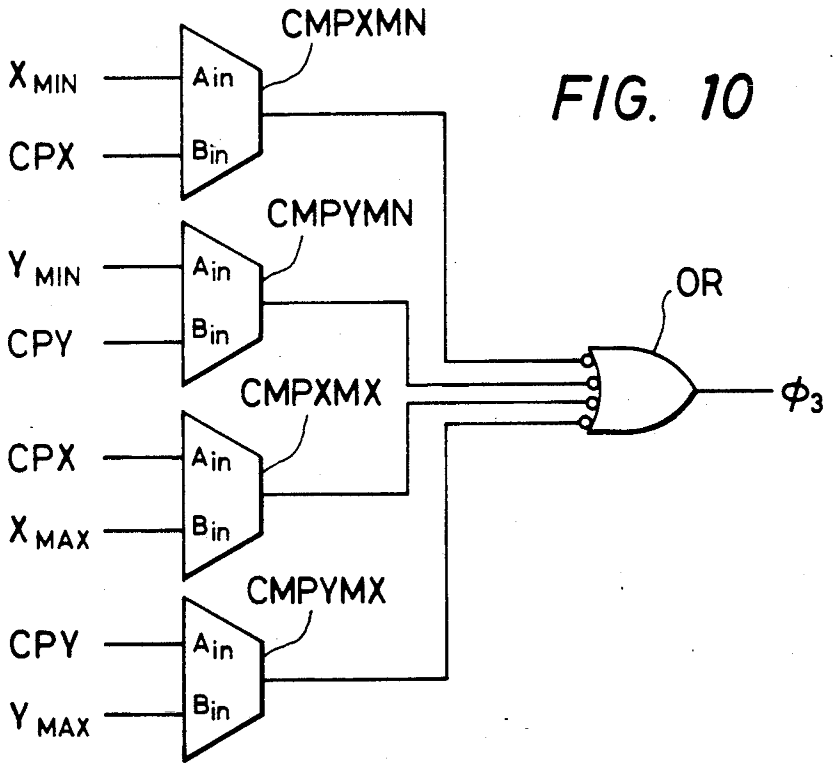
FIG. 10 is a circuit diagram showing an example of clipping area detecting means.

Though not particularly limitative, the clipping area detecting means ARD compares the coordinates of the points to be drawn in the X-Y coordinate system as the logical coordinate system which is the drawing coordinate system, or in other words, the coordinates (CPX, CPY) pointed by the current pointer, not shown, with the coordinates (XMIN, YMIN), (XMAX, YMAX) defining the clipping region CLPE as shown in FIG. 9, and controls the area flag $\phi_3$ to the high level when the drawing coordinate point (CPX, CPY) is outside the clipping region CLPE. This clipping area detecting means ARD is practically constituted through the calculator ALU described already and has the logic construction as shown in FIG. 10, for example. In other words, it consists of a comparator CMPXMN for comparing XMIN with CPX, a comparator CMPYMN for comparing YMIN with CPY, a comparator CMPXMX for comparing CPX with XMAX, a comparator CMPYMX for comparing CPY with YMAX, and an OR gate circuit OR for calculating the logical sum for the inversion level of the output signal of each of these comparators.

Each of the comparators CMPXMN, CMPYMN, CMPXMX, CMPYMX provides a low level signal at its output terminal when the relation Ain > Bin is established for the signal levels supplied to its pair of input terminals Ain and Bin and provides a high level signal when the relation Ain ≦ Bin is established. Therefore, when the drawing coordinate point (CPX, CPY) is outside the clipping region CLPE, the area flag $\phi_3$ outputted from the OR gate OR is controlled to the high level.

Figure 8:
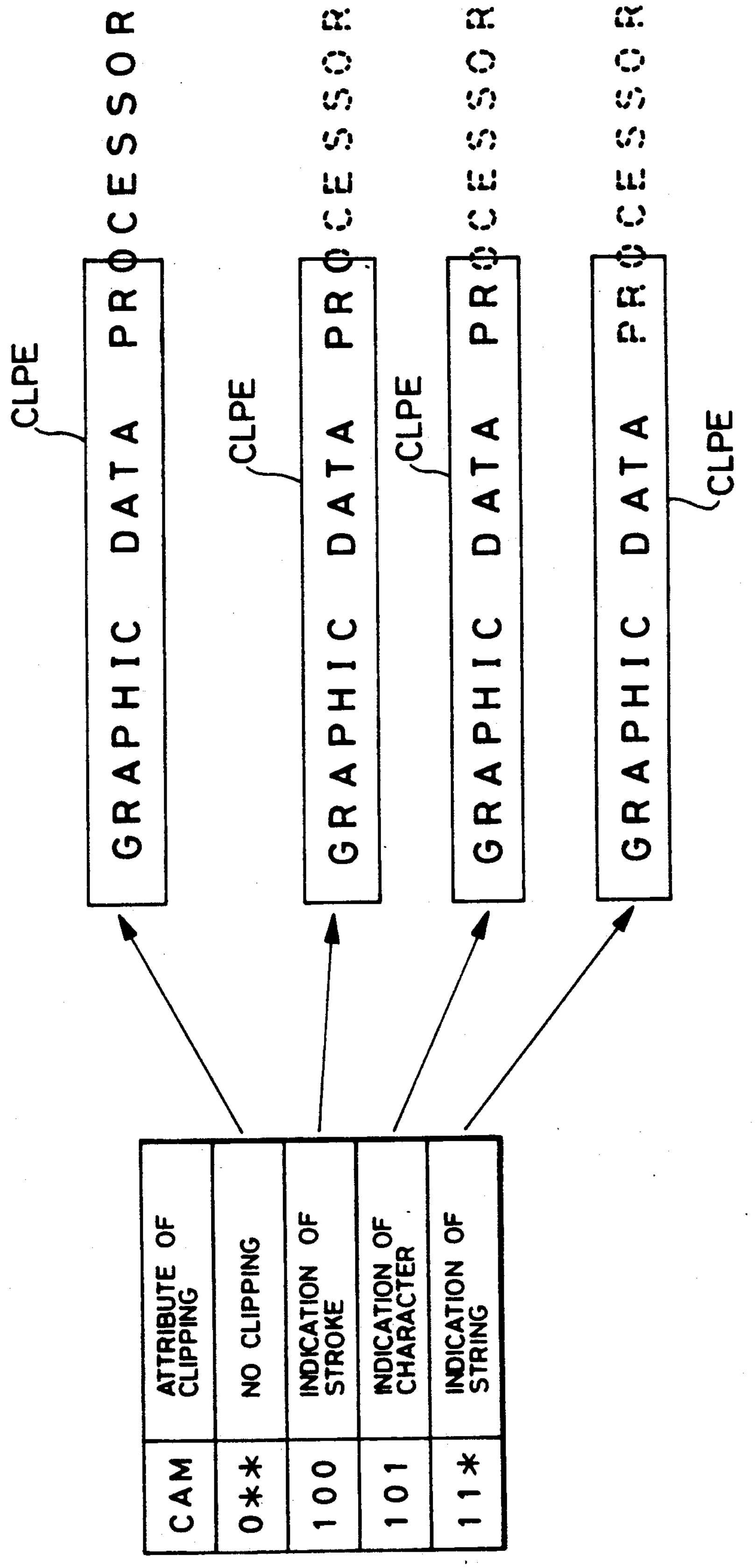
FIG. 8 is an explanatory view of the attributes of clipping.

When no-clipping is indicated on the basis of the set data of the character area mode register CAM, the control signal $\phi_2$ is the control signal which substantially inhibits the comparing operation by the clipping area detecting means ARD. For example, this control signal $\phi_2$ is the signal of the level corresponding to one bit on the left side in FIG. 8 among the 3-bit set data of the character area mode register CAM and its low level inhibits the operation of the clipping area detecting means ARD.

Figure 11:
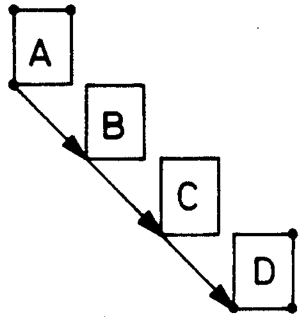
FIG. 11 is an explanatory view useful for explaining the principle of clipping area detection by indication of string contained in the clipping area attributes,.

The control signal $\phi_1$ described above is the signal which indicates the switch of the clipping control operation to the microprogram control means CMM on the basis of the set data of the character area mode register CAM. For example, it is the signal corresponding to the two bits on the right side in FIG. 8 among the 3-bit set data of the character area mode register CAM. More definitely, in the case of the indication of stroke described above, such a control operation sequence is selected that area detection is made by the clipping area detecting means ARD when drawing each pixel and after the existence of the drawing point inside the clipping region is detected by the area flag $\phi_3$, drawing of this pixel is conducted. In the case of the indication of character described above, there is selected a control operation sequence such that area detection is made by the clipping area detecting means ARD for the four apexes in the reactangular region of the character pattern before drawing of each character pattern and after all the pixels of this character pattern are detected existing inside the clipping region by the area flag $\phi_3$, this character pattern is then drawn. In the case of the indication of string described above, there is selected a control operation sequence such that area detection is made by the clipping area detecting means ARD for the six apexes such as shown in FIG. 11, for example, in the continuous region containing a character string before drawing of each character string and after all the pixels of this character string is detected existing inside the clipping region, this character string is drawn.

The combinations of the functions of the character pattern drawing that can be set by the pattern drawing attribute indicating means can be classified broadly into the following three types, though this is not particularly limitative. The first is the function which executes the rotation movement drawing in the 90° unit using the original font OF and the drawing with a character distance that is determined by the character distance DX, DY described above. The second is the function which executes the rotation movement drawing in the 90° unit using the variable font VF and the drawing with a character distance determined by the character spacing CHS described already and the third is the function which enlarges or reduces the original font OF or the variable font VF to the size determined by the character size CSX, CSY or inclines it by a quantity determined by the itallic offset IOFS and further executes its drawing by the rotation movement drawing in the 90° unit or with the character distance determined by the character spacing CHS. Particularly when it is expected that the distance must be changed frequently between the characters such as in drawing a caption or title, the third drawing function can be executed by the command which draws the characters one by one. Calculation of the drawing address when drawing is made with the attributes shown in FIGS. 12 to 16 is made by the execution unit controlled by the microprogram control means CMM.

Next, data setting to the font table pattern FPT 1 and font width table FWT 1 contained in the internal memory IDM 2 will be explained. Data setting to such regions can be made from the system side, too, whenever necessary, on the basis of the control of the microprocessor MPU. In this embodiment, other font pattern table FPT 2 and font width table FWT 2 consisting of ROMs are contained in the external memory EDM disposed in the external bus EBUS 2 as the local bus. In comparison with the rewritable font pattern table FTP 1 and font width table FWT 1, these font pattern table FPT 2 and font width table FWT 2 have by far a greater memory capacity and store therein various font patterns such as the character shape, the size, the kinds of characters such as the alphabet, the Greek characters, and so forth. The graphic data processor GDP can read them directly from these tables. Under such a construction, data setting to the font pattern table FPT 1 and font width table FWT 1 inside the graphic data processor GDP is accomplished by the transfer of the necessary data from the font pattern table FPT 2 and font width table FWT 2 as the external memory EDM. Unlike the data transfer from the system side, the data transfer in this case applies no load to the microprocessor MPU. Moreover, the speed of the drawing operation can be improved because the font pattern data having high access frequency in drawing can be read out from the internal memory IDM 2.

Furthermore, since the font pattern table and the font width table are stored separately and independently of each other in the different regions of the internal memory IDM 2, only the content of the font width table FWT 1 can be rewritten easily while leaving the stored data of the font pattern table FPT 1 as such, and a substantially different font pattern whose width is different can be obtained easily by rewriting the font width data through such a rewriting process.

Next, data setting to the font pattern access parameter storing means FDR and pattern drawing attribute defining parameter storing means FAR contained in the internal memory IDM 1 will be explained. Though data setting to these regions can be made by sequential control by the microprocessor MPU, it can be made by the data transfer from the non-display region in the frame buffer memory FBM as the external memory EDM on the local side. This can naturally reduce the load to the microprocessor MPU for the data setting. Moreover, since the font pattern access parameter and the pattern drawing attribute defining parameter can be set once again at a predetermined timing, the kinds of the drawing patterns and the drawing attributes can be diversified without changing the hardware structure. In such a case, it is necessary to store in advance the necessary access parameters and pattern drawing attribute defining parameters in the non-display region of the frame buffer memory FBM. Such an operation can be executed when the graphic data processor GDP receives the data transfer command from the microprocessor at the time of initial setting of the system, though this arrangement is not particularly limitative. Alternatively, the data transfer may be made from the microprocessor to the predetermined region of the frame buffer memory FBM at such a timing which does not impede drawing.

The present invention provide the following effects.

(1) The parameters for making access to the font pattern data defined in the font pattern storing means are stored in the FDR, and the font pattern data corresponding to a pattern code which is supplied from outside can be read out by only the internal address calculation processing on the basis of the font pattern access parameter and the pattern code. Therefore, when pattern drawing of the bit map system is made, it is not necessary for the microprocessor MPU to execute the address calculation for reading out the font pattern and to directly handle the font pattern data, but it is necessary for the microprocessor MPU only to handle the pattern code with the command. Therefore, the load to the microprocessor for drawing the characters and symbols can be reduced remarkably.

(2) If setting of the font pattern access parameter is changed, for example, if the font size FSX, FSY in the font pattern access parameter is set once again, the read bit width and the like of the font pattern in the longitudinal and transverse directions read out from the font pattern storing means can be changed without changing the font pattern data itself defined in the font pattern storing means. Therefore, unlike the conventional character generator system, it does not happen that the font pattern that can be handled is determined fixedly by the hardware. Therefore, the requirement for diversification of the processable font patterns can be accomplished with versatility.

(3) The font pattern that is substantially different can be obtained easily by merely changing the stored data of the font width defining region if the font pattern storing means is formed by the font shape defining region such as the font pattern table FPT 1 or FPT 2 and the font width defining region such as the font width table FWT 1 or FWT 2. In this case, if the font shape defining region and the font width defining region are formed individually in the predetermined continuous address spaces, respectively, the set change of either one of these data can be made easily.

(4) Since the font pattern storing means and the font pattern access parameter storing means are constituted by the internal memory, access to the font pattern data can be made at a high speed so that drawing efficiency can be improved.

(5) Since the font pattern storing means each consisting of the font pattern table and the font width table are formed both in the internal memory and the external memory and since the region of this internal memory is arranged in such a manner as to continue arbitrarily the external address space allotted to the external memory and to be capable of mapping, the internal memory incorporating therein the LSI accessible at a high speed and the external memory having a large memory capacity can be handled equivalently so that the system becomes easier to operate. In this case, the font pattern data having a high access frequency in drawing the patterns is transferred from the external memory to the internal memory and stored therein. In this manner, various font patterns can be drawn within the range of large quantities of data stored by the external memory even if the internal memory has a relatively limited memory capacity, and high speed drawing to the font pattern having the high use frequency can be insured.

(6) The font pattern data read out from the font pattern storing means by the internal address calculation processing on the basis of the font pattern access parameter can be drawn through the internal processing for changing its pattern structure or arrangement in accordance with the drawing attribute indicated by the pattern drawing attribute indicating means. Therefore, freedom of pattern drawing based on the basic pattern can be improved.

(7) If the pattern drawing attribute defining parameter such as the numeric data for the calculation of the drawing address is held inside the system, it is possible to give from outside the selection instruction of the parameter necessary for the drawing command. Therefore, the pattern having the drawing attribute such as enlargement, reduction, spacing, inclination, etc. can be obtained easily by the internal processing.

(8) If the control register for rewritably holding the control data for giving the switch instruction of the pattern drawing operation to the microprogram control means CMM, such as the character area mode register CAM, is disposed, the pattern having the drawing attribute such as the clipping attribute to the pattern sequence can be obtained easily through the internal processing by setting from outside the value of the control register.

(9) If the pattern code supplied from outside is contained in the command, the pattern having the drawing attribute indicated by the control code can be drawn through the internal processing by merely receiving a predetermined command from the microprocessor by letting the command contain the control code giving the switch instruction of the pattern drawing operation.

(10) If the font data processor has the font width table FWT 1 for FWT 2 for defining the substantial width of the font pattern for each pattern and the font size common to a group of font patterns are stored as the access parameter in the font pattern access parameter storing means, control whether the reference to the font width table FWT 1 or FWT 2 when making access to the font pattern table FTW 1 or FWT 2 is made by the control bits that are contained in the command code and in this manner, the pattern drawing can be selected in the fixed pattern width such as the original font OF or in the variable pattern width such as the variable font VF.

Although the present invention made by the inventor of the present invention has thus been described with reference to one embodiment thereof, the invention is not particularly limited thereto but can be changed in various manners without departing from the spirit and scope thereof.

For example, the font pattern access parameter, the pattern drawing attribute defining parameter and other control data for indicating the pattern drawing attributes are not particularly limited to the data structure described in the foregoing embodiment but can be changed suitably in accordance with the function of the graphic data processor to which the font data processor is applied. Furthermore, the various internal bus structures and the interface systems with outside are not particularly limited to the embodiment described above and the coupling system with the microprocessor, for example, may be such a connection which permits direct access without passing through the read/write FIFO. Though the embodiment described above employs the structure wherein the various parameter storing region and data tables are formed by disposing the internal memory IDM 1 for storing the data having a relatively low access frequency and the internal memory IDM 2 for storing the data having a relatively high access frequency, these regions may be formed by one internal memory, and one of the internal memories IDM 2 need not have the structure wherein mapping can be made to the external address space. In the internal memory IDM 2 for storing the data having a relatively high access frequency, those data for which rewriting is hardly necessary may be stored in ROM (Read-Only Memory). Though the font pattern table FPT 1 and the font width table FWT 1 are disposed inside the internal memory IDM 2 in order to satisfy the requirement for the high speed operation, it is also possible to employ such a structure wherein the font pattern table FPT 1 and the font width table FWT 1 are not provided inside the font data processor but only the font pattern table FPT 2 and the font width table FWT 2 are provided outside the apparatus. In such a case, the font pattern table FPT 2 and the font width table FWT 2 may consist of rewritable memories.

Though the description given above primarily represents the application of the present apparatus to the graphic data processor as the background and the field of utilization of the present invention, the present invention is not particularly limited thereto but can be applied to various data processors such as display controllers, drawing processors, and so forth. In other words, the present invention can be applied to graphic data processors under the condition where the font data are processed in accordance with the pattern code supplied at least from outside such as characters.

What is claimed is:

1. A font data processing system for displaying individual font patterns comprising:

font pattern storing means having a plurality of font shape defining regions, each region storing a front pattern, wherein the plurality of font shape defining regions have equal memory widths and memory capacity;

pattern width storing means having a plurality of font width defining regions, the plurality of font width defining regions corresponding to the font patterns stored int he plurality of font shape defining regions, respectively, and each font width defining region storing width data for defining a substantial font width of a corresponding font pattern, the plurality of font width defining regions set in separately accessible address spaces form the font shape defining regions;

font pattern access parameter means for storing a start address of said font pattern storing means, size data common to the regions for defining the font patterns in said font shape defining regions and a start address of said pattern width storing means;

controlling means for controlling whether reference is to be made to one of said font width defining regions on the basis of control data included in an external drawing command supplied to the controlling means;

calculating means, coupled to said controlling means, for executing address calculation by use of the common size data stored in said font pattern access parameter means when reference is not made to said font width defining region, and for executing address calculation by use of the width data in said font width defining region when reference is made to said font width defining region; and, accessing means for accessing the font pattern storing means in accordance with the calculated address data from said calculating means, such that font pattern data represented by said drawing command is read out from said font pattern storing means.

2. The font data processing system according to claim 1 wherein said font pattern access parameter means is formed in a rewritable internal memory of a font data processor which includes said accessing means, said calculating means and said controlling means.

3. The font data processing system according to claim 2, further including transferring means for transferring font pattern access parameters from memory external to the font data processor through a local bus to said internal memory in which said font pattern access parameter means is formed, said font pattern access parameters including said start address of said font pattern storing means, said common size data and said start address of said pattern width storing means.

4. The font data processing system according to claim 1, wherein said font pattern storing means is formed in a predetermined region of an internal memory of a font data processor including said accessing means, said calculating means and said controlling means and in a predetermined region an external memory of said font data processor coupled with said internal memory through a local bus.

5. The font data processing system according to claim 4, further including means for mapping a predetermined region of said internal memory to function as said font pattern storing means, said font pattern storing means being a continuation of an arbitrary space of the internal address space allotted to said external memory, means for detecting the address sent to said mapping means and switch means for switching an access object between said internal memory and said external memory on the basis of the detection of a result of said detection means.

6. The font data processing system according to claim 1, wherein said accessing means, said calculating means and said controlling means are included in a font data processor and the font data processor further includes an internal memory having a region which is used as the pattern width storing means and wherein a region of a memory provided outside of the font data processor is used as the font pattern storing means.

7. The font data processing system according to claim 6, wherein said external drawing command is provided from a central processor coupled to said font data processor.

8. The font data processing system according to claim 7, wherein said width data includes first data for defining one side of the font pattern in a horizontal direction and second data for defining an other side of the font pattern in the horizontal direction so as to substantially equalize a distance between a font pattern and a font pattern adjacent thereto of a plurality of font patterns to be displayed in the horizontal direction.

9. The font data processing system according to claim 1, wherein said accessing means, said calculating means and said controlling means are included in a font data processor and wherein regions of a memory outside of the font data processor are used as the pattern width storing means and the font pattern storing means.

10. The font data processing system according to claim 9, wherein said external drawing command is provided from a central processor coupled to said font data processor.

11. The font data processing system according to claim 10, wherein said width data includes first data for defining one side of the font pattern in a horizontal direction and second data for defining an other side of the font pattern int he horizontal direction so as to substantially equalize a distance between a font pattern and a font pattern adjacent thereto of a plurality of font patterns to be displayed in the horizontal direction.

12. The font data processing system according to claim 1, further including inhibiting means for inhibiting the calculating means from calculating the address data on a basis of the width data.

13. The font data processing system according to claim 1, wherein said external drawing command is provided from a central processor.

14. The font data processing system according to claim 13, wherein said width data includes first data for defining one side of the font pattern in a horizontal direction and second data for defining an other side of the font pattern int he horizontal direction so as to substantially equalize a distance between a font pattern and a font pattern adjacent thereto of a plurality of font patterns to be displayed in the horizontal direction.

15. A font data processing system comprising:

a font pattern storing means having a plurality of font shape defining regions, each region storing a font pattern, wherein the plurality of font shape defining regions have equal memory widths and memory capacity;

a pattern width storing means having a plurality of font width defining regions, the plurality of font width defining regions corresponding to font patterns stored in the plurality of font shape defining regions, respectively, and each font width defining region storing width data for defining a variable font width of a corresponding font pattern; and a font data processor including, calculating means for calculating address data for indicating a predetermined font shape defining region i the font pattern storing means, font pattern access parameter means for storing a plurality of access data and means responsive t an externally provided pattern code which includes indication data for indicating one of, use of a variable font data and use of an original font data for causing the calculating means to include access data of the font pattern access parameter means and width data from the pattern width storing means in its calculating when the indication data indicates the use of the variable font data, and for causing the calculating means to include access data of the font pattern access parameter means in its calculating to avoid reference to the pattern width storing means when the indication data indicates the use of the original font data, wherein said font data processor further includes accessing means for accessing the font pattern storing means in accordance with the calculated address data, such that font pattern data corresponding to said pattern code is read out from said font pattern storing means, and, pattern drawing attribute indicating means for indicating a predetermined attribute of the font pattern to be drawn by font pattern data read out from said font pattern storing means on the basis of the externally provided pattern code.

16. The font data processing system according to claim 15, wherein said pattern drawing attribute indicating means is formed in an internal memory, included in the font data processor, for storing rewritable pattern drawing attribute defining parameters.

17. The font data processing system according to claim 16, wherein said pattern drawing attribute defining parameters include drawing distance between the patterns and numeric data relating t enlargement, reduction and inclination of said pattern.

18. The font data processing system according to claim 15, wherein said pattern drawing attribute indicating means is a control register for rewritably holding control data for giving a switch instruction of a pattern drawing operation to microprogram control means included in the font data processor.

19. The font data processing system according to claim 18, wherein said control data are the data which indicate drawing of a pattern for clipping region in a pixel unit, a pattern unit or a pattern sequence unit.

20. The font data processing system according to claim 15, wherein said pattern drawing attribute indicating means includes store means for storing information for selecting a pattern drawing operation, said information being provided from a drawing command.

21. The font data processing system according to claim 15, wherein said pattern drawing attribute indicating means includes code data for instructing a rotation movement quantity for a font pattern.

22. A font data processing system comprising:

pattern width storing means having a plurality of font width defining regions, the plurality of font width defining regions corresponding to a plurality of font patterns, respectively, and each font width defining region storing width data for defining a variable font width of a corresponding font pattern;

font pattern access parameter means for storing a plurality of access data;

calculating means for calculating address data indicating a predetermined shape defining region in a font pattern storing means which is external to the font data processor;

controlling means, coupled to said calculating means, responsive to a drawing command which is provided from a central processor and which includes indication data for indicating at least one of, use of a variable font data and use of an original font data, for causing the calculating means to include access data of the font pattern access parameter means and the width data from the pattern width storing means in its calculating when the indication data indicates the use of the variable font data, and for causing the calculating means to include access data of the font pattern access parameter means in its calculating without reference to the pattern width storing means when the indication data indicates the use of the original font data; and accessing means for accessing the external font pattern storing means in accordance with the calculated address data, such that the font pattern corresponding to the drawing command is read out from the external font pattern storing means;

wherein the external font pattern storing means includes a plurality of font shape defining regions which store the plurality of font patterns, wherein the plurality of font shape defining regions have equal memory widths and capacity.

23. The font data processor according to claim 22, further including a pattern drawing attribute indicating means for indicating an attribute of a font pattern to be drawn according to font pattern data read out from the external font pattern storing means.

24. The font data processor according to claim 23, wherein said width data includes first data for defining one side of the font pattern in a horizontal direction and second data for defining an other side of the font pattern in the horizontal direction so as to substantially equalize a distance between a font pattern and a font pattern adjacent thereto of a plurality of font patterns to be displayed in the horizontal direction.

25. A font data processing system comprising:

font pattern storing means having a plurality of font shape defining regions, each region storing a font pattern, wherein the plurality of font shape defining regions have equal memory widths and memory capacity;

pattern width storing means having a plurality of font width defining regions, the plurality of font width defining regions corresponding to a plurality of font patterns, respectively, and each font width defining region storing width data for defining a variable font width of a corresponding font pattern; and a font data processor including, calculating means for calculating address data indicating a predetermined font shape defining region in the font pattern storing means, font pattern access parameter means for storing a plurality of access data, and controlling means coupled to said calculating means, responsive to a command including indication data for at least one of, use of a variable font data and use of an original font data, for causing the calculating means to include access data of the font pattern access parameter means and the width data from the pattern width storing means in its calculating if the indication data indicates the use of the variable font data, and for causing the calculating means to include access data of the font pattern access parameter means in its calculating without reference to the pattern width storing means when the indication data indicates the use of the original font data, accessing means for accessing the font pattern storing means in accordance with the calculated address data, such that a font pattern corresponding to said command is read out from said font pattern storing means.

26. The font data processing system according to claim 25, further including a central processor which provides said command.

27. The font data processing system according to claim 26, wherein said width data includes first data for defining one side of ht font pattern in a horizontal direction and second data for defining an other side of the font pattern in the horizontal direction so as to substantially equalize a distance between a font pattern and a font pattern adjacent thereto of a plurality of font patterns to be displayed in the horizontal direction.

* * * * *

UNITED STATES PATENT AND TRADEMARK OFFICE
CERTIFICATE OF CORRECTION

PATENT NO. : 5,175,811

DATED : December 29, 1992

INVENTOR(S) : Takashi Sone, et al.

It is certified that error appears in the above-identified patent and that said Letters Patent is hereby corrected as shown below:

Title Page:
[63] Continuation of Ser. No. 595,790, Oct. 9, 1990, which is a continuation of Ser. No. 194,890, May 17, 1988.

Claim 1, column 16, line 53, delete "front" and replace with --font--.

Claim 1, column 16, line 60, delete "int he" and replace with --in the--.

Claim 4, column 17, line 41, after "region" insert --of--.

Claim 11, column 18, line 21, delete "int he" and replace with --in the--.

Claim 14, column 18, line 36, delete "int he" and replace with --in the--.

Claim 15, column 18, line 56, delete "i" and replace with --in--.

Claim 15, column 18, line 58, delete "t" and replace with --to--.

Claim 17, column 19, line 24, delete "t" and replace with --to--.

Claim 22, column 19, line 45, delete "processing system" and replace with --processor--.

Claim 27, column 21, line 6, delete "of hte" and replace with --of the--.

Signed and Sealed this

Nineteenth Day of October, 1993

Attest:

Bruce Lehman

BRUCE LEHMAN

*Attesting Officer* *Commissioner of Patents and Trademarks*